(12) United States Patent
O'Moore et al.

(10) Patent No.: US 11,893,625 B2
(45) Date of Patent: Feb. 6, 2024

(54) SYSTEM AND METHOD FOR FORECASTING REAL ESTATE SOLUTIONS

(71) Applicant: CBRE, Inc., Dallas, TX (US)

(72) Inventors: Marshall O'Moore, New York, NY (US); Ruiqi Hu, Riverside, CT (US); Christelle Bron, New York, NY (US); Derek Chanler-Berat, Bedford Corners, NY (US)

(73) Assignee: CBRE, Inc., Los Angeles, CA (US)

( * ) Notice: Subject to any disclaimer, the term of this patent is extended or adjusted under 35 U.S.C. 154(b) by 291 days.

(21) Appl. No.: 17/076,374

(22) Filed: Oct. 21, 2020

(65) Prior Publication Data

US 2021/0125271 A1 Apr. 29, 2021

Related U.S. Application Data

(60) Provisional application No. 62/924,846, filed on Oct. 23, 2019.

(51) Int. Cl.
  *G06Q 30/0645* (2023.01)
  *G06Q 10/10* (2023.01)
  (Continued)

(52) U.S. Cl.
  CPC ........... *G06Q 30/0645* (2013.01); *G06N 3/08* (2013.01); *G06N 5/046* (2013.01); *G06Q 10/10* (2013.01); *G06Q 50/16* (2013.01)

(58) Field of Classification Search
  None
  See application file for complete search history.

(56) References Cited

U.S. PATENT DOCUMENTS

| | | |
|---|---|---|
| 2005/0171877 A1 | 8/2005 | Weiss |
| 2006/0161447 A1 | 7/2006 | O'Hollearn et al. |

(Continued)

FOREIGN PATENT DOCUMENTS

| | | |
|---|---|---|
| JP | 20090254389 A | 3/2010 |
| JP | 2012238300 A | 12/2012 |

(Continued)

OTHER PUBLICATIONS

Graczyk, Magdalena, et al. "Comparison of bagging, boosting and stacking ensembles applied to real estate appraisal." Intelligent Information and Database Systems: Second International Conference, ACIIDS, Hue City, Vietnam, Mar. 24-26, 2010. Proceedings, Part II 2. Springer Berlin Heidelberg, 2010. (Year: 2010).*

(Continued)

*Primary Examiner* — Michael Young
(74) *Attorney, Agent, or Firm* — DLA Piper LLP (US)

(57) ABSTRACT

A computer-implemented system and method of analyzing historical business data and business objectives for real estate solution prediction is provided. The method includes receiving a user dataset associated with a business entity by a server computing device. The server may determine a set of forecasted headcounts at different points of future time based on a historical headcount, generate a plurality of scenarios associated with the business entity based on the forecasted headcount and the commercial objective dataset, and construct option trees with respective real estate solutions corresponding to respective scenarios. A neural network system may be configured to perform stress tests against respective scenarios to evaluate respective real estate solutions and determine respective costs and actions associated with respective real estate solutions. The computing device may determine an optimal real estate solution with a (Continued)

minimized cost and a corresponding action that the business entity takes to minimize the costs.

18 Claims, 11 Drawing Sheets

(51) Int. Cl.
  *G06N 5/046* (2023.01)
  *G06N 3/08* (2023.01)
  *G06Q 50/16* (2012.01)

(56) References Cited

U.S. PATENT DOCUMENTS

| | | | |
|---|---|---|---|
| 2009/0254389 A1* | 10/2009 | Teal | G06Q 10/0631 |
| | | | 705/7.12 |
| 2009/0254395 A1 | 10/2009 | Lynn et al. | |
| 2011/0191226 A1 | 8/2011 | Ngo et al. | |
| 2014/0136294 A1 | 5/2014 | Martinovic et al. | |
| 2017/0039508 A1* | 2/2017 | French | G06Q 10/1097 |
| 2020/0202420 A1* | 6/2020 | Van Dyke | G06Q 30/0645 |
| 2020/0258120 A1* | 8/2020 | Ardulov | G06F 16/90335 |
| 2021/0035128 A1* | 2/2021 | Benkreira | G06Q 30/0205 |
| 2021/0049700 A1* | 2/2021 | Nguyen | G06N 3/08 |

FOREIGN PATENT DOCUMENTS

| | | | | |
|---|---|---|---|---|
| JP | 2014219484 A | 11/2014 | | |
| JP | 2018077559 A | 5/2018 | | |
| WO | 2019113397 A1 | 6/2019 | | |
| WO | WO-2020167371 A1 * | 8/2020 | | G06F 16/90335 |

OTHER PUBLICATIONS

PCT International Application No. PCT/US2020/056672, International Search Report of the International Searching Authority, dated Jan. 21, 2021, 3 pages.

PCT International Application No. PCT/US2020/056672, Written Opinion of the International Searching Authority, dated Jan. 21, 2021, 10 pages.

Office Action issued in Japanese Application No. 2022-523850, 7 pages, dated May 19, 2023.

Office Action issued in IN Application No. 202217027109, 9 pages, dated Sep. 10, 2023.

* cited by examiner

SYSTEM AND METHOD FOR FORECASTING REAL ESTATE SOLUTIONS

CROSS-REFERENCE TO RELATED APPLICATION

This application claims the benefit of U.S. Provisional Patent Application No. 62/924,846, filed Oct. 23, 2019, and entitled "System and Method for Predicting Business Solutions", the entirety of which is incorporated herein by reference.

TECHNICAL FIELD

The present disclosure relates to forecasting real estate solutions, and more specifically to applying futureproofing methodology to analyze business data for predicting and optimizing real estate solutions.

BACKGROUND

When businesses evaluate their real estate, the biggest cost affecting each business may be related to the size of the business real estate occupying space. A business may need a right space that meets the business and real estate objectives. Forecasting future real estate space needs for a business is challenging because the evolution of the business over time usually cannot be foreseen at the time of forecasting. The business may be affected by variables in the quantity and quality of the business space headcount, as well as market forces that may affect their industry.

In existing systems, the business often relies on a real estate professional asking the business about its future space needs and providing lease options, which most likely results in imprecise estimates. There is a need to consider different variables to understand a business's commercial requirements and needs in the future and provide an optimal real estate solution for its long-term real estate needs.

SUMMARY

In accordance with some embodiments of the present disclosure, there is provided a computer-implemented method for predicting and optimizing real estate solutions. The method comprises receiving, by a server computing device comprising a processor and a non-volatile memory storing computer-executable instructions, a user dataset associated with a business entity from a user computing device via a network, wherein the user dataset comprises a historical headcount associated with the business entity and a business objective dataset. The method also comprises determining, based on the historical headcount associated with the business entity, a set of forecasted headcounts at different points of a future time span, and generating, based on the set of forecasted headcounts and the business objective dataset, a plurality of scenarios associated with the business entity. The method further comprises constructing, by the server computing device, discrete option trees with respective discrete real estate solutions corresponding to respective scenarios, and performing, through a neural network system by the server computing device, a plurality of stress tests on the plurality of the scenarios against the forecasted headcount to evaluate respective discrete real estate solutions and determine respective costs and actions associated with respective discrete real estate solutions with respective costs and actions. The method still further comprises identifying, based on respective costs and actions associated with the determined respective discrete real estate solutions by the server computing device, an optimal real estate solution with a minimized cost and a corresponding action that the business entity takes to minimize the costs, and providing, by the server computing device, information for causing a visual representation identifying an optimal real estate solution for the business entity to be displayed on a display of a user computing device.

In accordance with aspects of the disclosure, the method comprises generating a value for using a flexible office space solution, and providing the business entity with an option that combines a traditional lease option with the flexible office space solution.

In accordance with further aspects of the disclosure, the neural network system comprises a first network and a second network, wherein the first network and the second network are alternatively trained till convergence.

In accordance with still further aspects of the disclosure, the method comprises iteratively training the first network to predict future costs of the real estate solutions by minimizing the predictive error using an optimizer, and training the second network to choose a best cost minimizing solution for the costs generated by the first network.

In accordance with aspects of the disclosure, the business objective dataset associated with the business comprises a lease space, a lease term, and a lease structure that the business requests.

Furthermore, in accordance with some embodiments, there is provided a computing system for predicting and optimizing real estate solutions, the computing system comprising a non-volatile memory storing computer-executable instructions and a processor coupled to the memory. The processor, when executing the instructions, is configured to receive a user dataset associated with a business entity from a user computing system via a network, wherein the user dataset comprises a historical headcount associated with the business entity and a business objective dataset, and determine, based on the historical headcount associated with the business entity, a set of forecasted headcounts at different points of a future time span. The processor, when executing the instructions, is further configured to generate, based on the set of forecasted headcounts and the business objective dataset, a plurality of scenarios associated with the business entity, and construct discrete option trees with respective discrete real estate solutions corresponding to respective scenarios. The processor, when executing the instructions, is still further configured to perform, through a neural network system, a plurality of stress tests on the plurality of the scenarios against the forecasted headcount to evaluate respective discrete real estate solutions and determine respective costs and actions associated with respective discrete real estate solutions, identify, based on the determined respective discrete real estate solutions, an optimal real estate solution with a minimized cost and a corresponding action that the business entity takes to minimize the costs, and provide information for causing a visual representation identifying an optimal real estate solution for the business entity to be displayed on a display of a user computing device.

In accordance with aspects of the disclosure, the processor, when executing the instructions, is further configured to generate a value for using a flexible office space solution, and provide the business entity with an option that combines a traditional lease option with the flexible office space solution.

In accordance with further aspects of the disclosure, the neural network system comprises a first network and a second network, and wherein the first network and the second network are alternatively trained till convergence.

In accordance with still further aspects of the disclosure, the processor, when executing the instructions, is further configured to iteratively train the first network to predict future costs of the real estate solutions by minimizing the predictive error using an optimizer; and train the second network to choose a best cost minimizing solution for the costs generated by the first network.

In accordance with aspects of the disclosure, the business objective dataset associated with the business comprises a lease space, a lease term, and a lease structure that the business requests.

It is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments. In addition, it should be understood that any figures which highlight the functionality and advantages are presented for example purposes only. The disclosed methodology and system are each sufficiently flexible and configurable such that they may be utilized in ways other than that shown.

DETAILED DESCRIPTION

Figure 1:
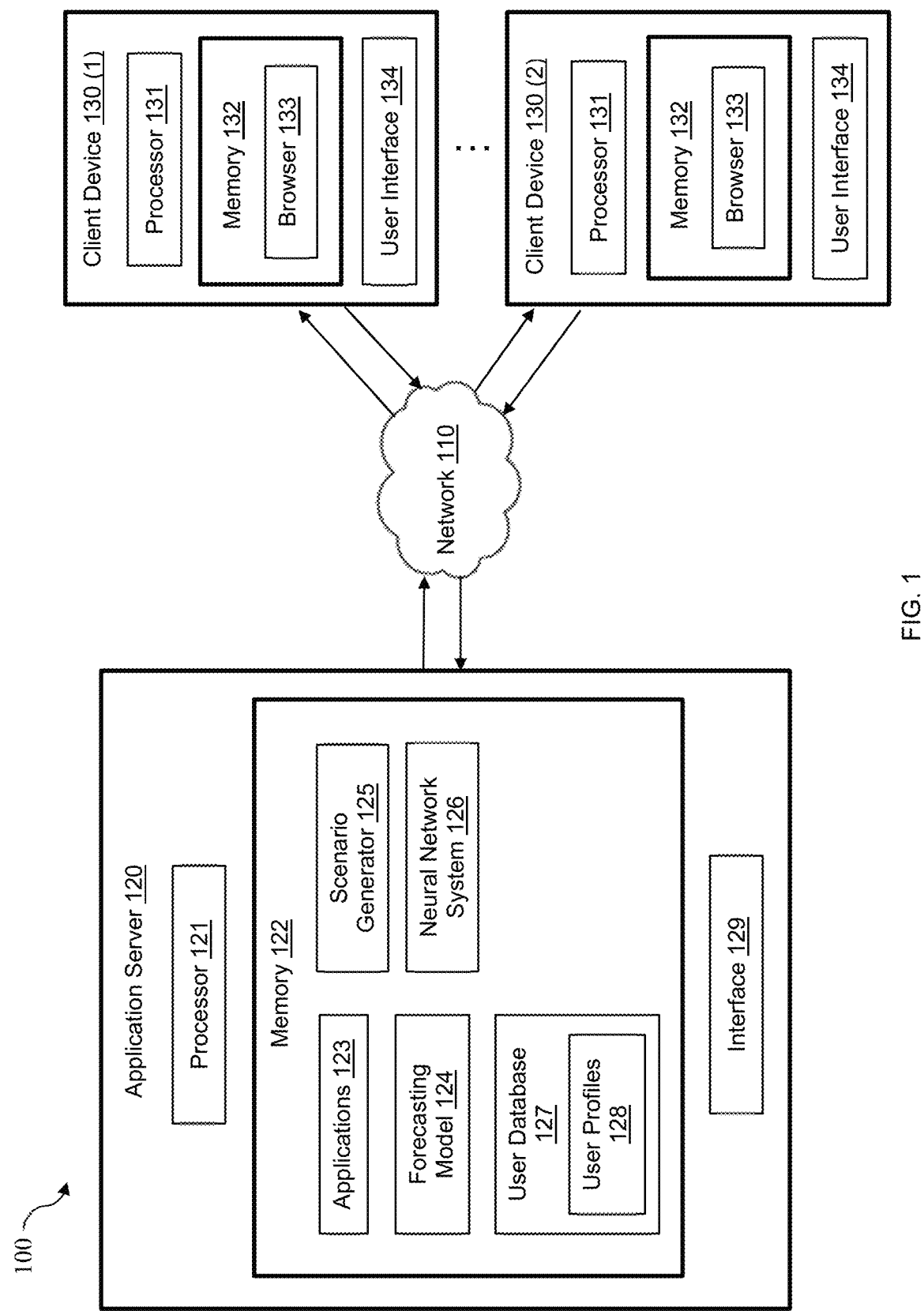
FIG. 1 illustrates an example computing system 100 for providing real estate solution prediction according to some embodiments of the present disclosure.

Embodiments of the present disclosure describe futureproofing systems and methods using a neural network to process historical business data and business objectives for predicting and optimizing real estate solutions. Embodiments described herein are directed to a system and method to build agile strategies to futureproofing real estate solutions that can align businesses' real estate to their business objectives while maintaining the ability to pivot seamlessly amid an increased pace of business and economic changes.

Embodiments provided herein describe a computing system and method for providing a futureproofing analytical tool to analyze historical business real estate data and forecast future real estate solutions within different future timespans. Further, the system and method may utilize deep learning technology to assist businesses in determining optimal solutions for their long-term real estate needs. For example, the system may be created to help forecast the size of real estate space and mix of leasing options that would be likely to minimize a business's real estate spending over time and provide customized recommendations for an individual business based on the business historical development facts, business objectives, market trends, etc.

Embodiments of the present disclosure describe a computing system that includes a deep learning neural network system with various machine learning models to analyze business data associated with a business entity. The system may be implemented to perform a variety of operations, including: forecasting headcount demand based on a history of a business or its industry and volatility; developing real estate and occupancy scenarios based on the forecasted headcount; performing stress tests on the real estate and occupancy scenarios against a range of headcount forecasts; and determining an optimal real estate solution. In addition to this innovative process, the system may include innovative features for providing businesses with visual reporting of its real estate lease options and for providing an option that combines a traditional lease option with a flexible lease option.

Embodiments described herein address a computer-centric and Internet-centric problem of forecasting a future headcount demand and further provide an optimal real estate solution for a business entity. Further, embodiments described herein may provide technology-based improvements for predicting real estate solutions for an individual business entity by combining business real estate information analysis and a deep learning neural network system. The deep learning neural network system may be implemented as one or more computer programs or pieces of application software on one or more computing devices that process business data of the business entity and optimize real estate solutions. The improvements of the present disclosure as reflected in embodiments described herein may generate an automatic processing system to provide optimal financial solutions for each respective business entity, including: providing a right size of real estate space by better understanding and quantifying business future demand and its various components, providing a right mix of lease staggering, lease optionality, co-working, and/or flexible workplace programs to create the agility a business entity needs; balancing an additional cost versus benefit of flexibility for business entities; and minimizing cost over the lifecycle of business entity occupancy and mitigating risk associated with high growth and contraction scenarios.

FIG. 1 illustrates an example computing system 100 for providing real estate solutions according to some embodiments. As illustrated, system 100 may include an application server 120 (e.g., a server computing device) and a plurality of user/client devices 130 (e.g., a user/client computing device). Application server 120 may be in communication with a plurality of client devices 130 within a cloud-based or hosted environment via a network 110. Application server 120 may include a processor 121, a memory 122 and a communication interface for enabling communication over network 110.

Application server 120 may include one or more online applications 123 stored in memory 122 and executed by processor 121 for providing one or more online services and providing a website with particular services for users to visit. In some embodiments, application server 120 may include a forecasting model 124, a scenario generator 125, a neural network system 126, a user database 127, an interface 129, etc. The deep neural network system 126 may be configured to process business user datasets for forecasting future real estate solutions. The deep neural network system 126 may be one of the components of the applications 123. Applications 123 may include a web application to provide an online software service hosted by a real estate solution provider. The online software service may be accessed by the client device 130 via a browser application 133. Further, memory 122 may store applications 123, a neural network system 126, and other program modules which are implemented in the context of computer-executable instructions and executed by application server 120.

Client device 130 may include a processor 131, a memory 132, a browser application 133, and a user interface 134. Browser application 133 may facilitate user interaction with application server 120 and may be configured to transmit information to and receive information from application server 120 via network 110. The user interface 134 may be configured to receive the data via network 110. Client device 130 may be any device configured to present user interfaces and receive inputs thereto. For example, client device 130 may be a smartphone, a personal computer, a tablet, a laptop computer, a personal digital assistant (PDA), or any computing system that is equipped with browser application 133, which may be used to provide a convenient interface to allow a user to interact with an online application product running in application server 120 over network 110. Network 110 may be the Internet and/or other public or private networks or combinations thereof.

Application server 120 is depicted as a single device for ease of illustration, but those of ordinary skill in the art will appreciate that application server 120 may be embodied in different forms for different implementations. For example, application server 120 may include a plurality of servers communicating with each other through network 110. Alternatively, the operations performed by application server 120 may be performed on a single server. In another example, a plurality of client devices 130 may communicate with application server 120. A single user may have multiple client devices 130, and/or there may be multiple users each having their own client device(s) 130.

System 100 may include a user database 127 which may be coupled to or in communication with the application server 120 via network 110. User database 127 may be a shared remote database, a cloud database, or an on-site central database. User database 127 may receive instructions or data from and send data to application server 120 via network 110. The database 127 may store business user profiles 128 of a plurality of business entities. Each business may create a user account with business information which may be stored as a user profile 128 in user database 127. Each business user or representative may access a particular product or service hosted on the application server 120 with the user account.

Figure 2:
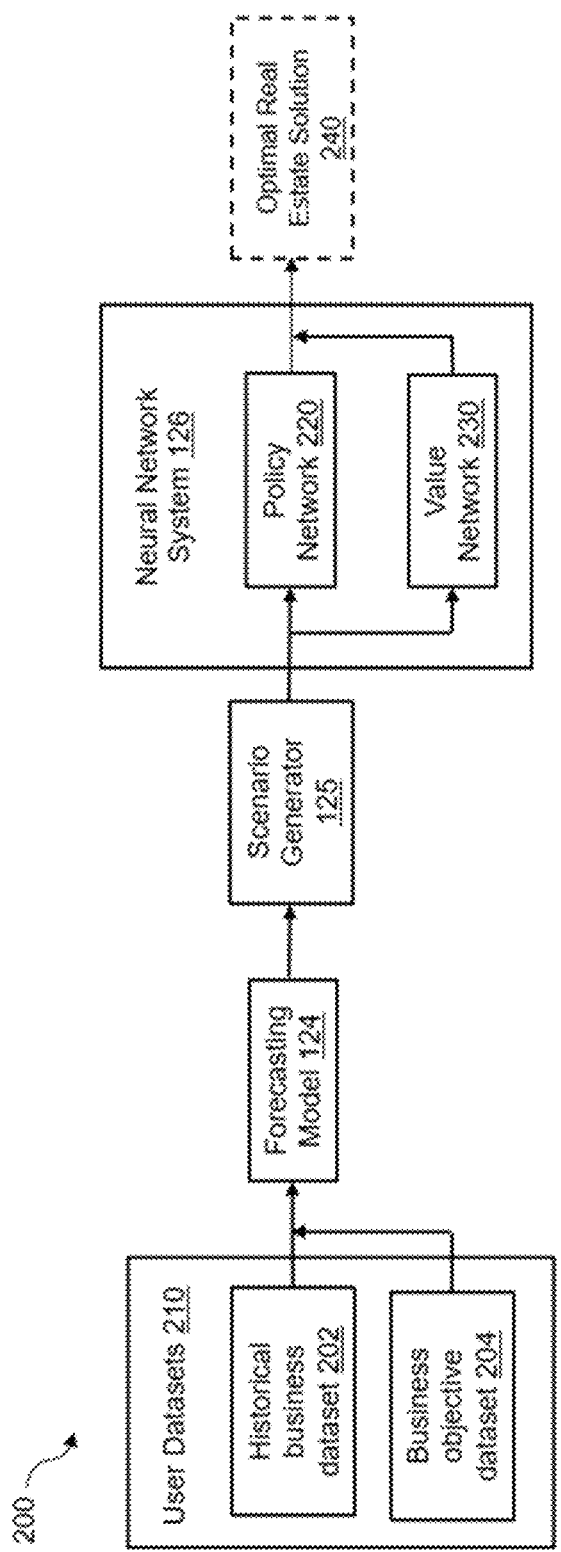
FIG. 2 is an example conceptual system diagram of performing the real estate solution according to some embodiments of the present disclosure.

FIG. 2 is a conceptual diagram of an example system 200 for performing the real estate solution prediction for a business entity. The system 200 may be configured as computer programs (e.g., software) executed on one or more computers, in which the systems, model components, processes, and embodiments described below can be implemented and executed by an application server 120 and other computing devices.

In some embodiments, system 200 may include various functional modules, such as a forecasting model 124, a scenario generator 125, and a neural network system 126. Each of these models of operations is outlined in more detail below.

The application server 120 may read a user profile 128 associated with a business entity or receive inputs from a user computing device 130 via an interface 129. The user profile 128 of each business entity may be constructed and represented as a business user dataset 210 (e.g., user dataset). The user dataset 210 may include a plurality of business attributes, historical business data and future business objectives. For example, the user dataset 210 associated with a business entity may include real estate information, financial information, business and employee information, occupancy and workplace data, etc. The user dataset 210 associated with a business entity may include a historical business dataset 202 and a business objective dataset 204. For example, the historical business dataset 202 may include a business name, a business identifier (ID), historical headcount data, and any other historical business information. A business objective dataset 204 of the business entity may include a size of the requested space for the business (e.g., lease space), a length of the real estate lease term (e.g., lease term), and a structure of the real estate lease (e.g., lease structure) that the business is considering, etc.

In some embodiments, the forecasting model 124 may be executed by the application server 120 to forecast the headcount demand. The scenario generator 125 may be executed by the application server 120 to develop real estate and occupancy scenarios based on the forecasted headcount. A trained neural network system may be executed by the application server 120 to perform stress tests on the real estate and occupancy scenarios against the range of headcount forecasts. The computing system is configured to determine the optimal real estate solution.

Headcount Forecasting

Figure 3A:
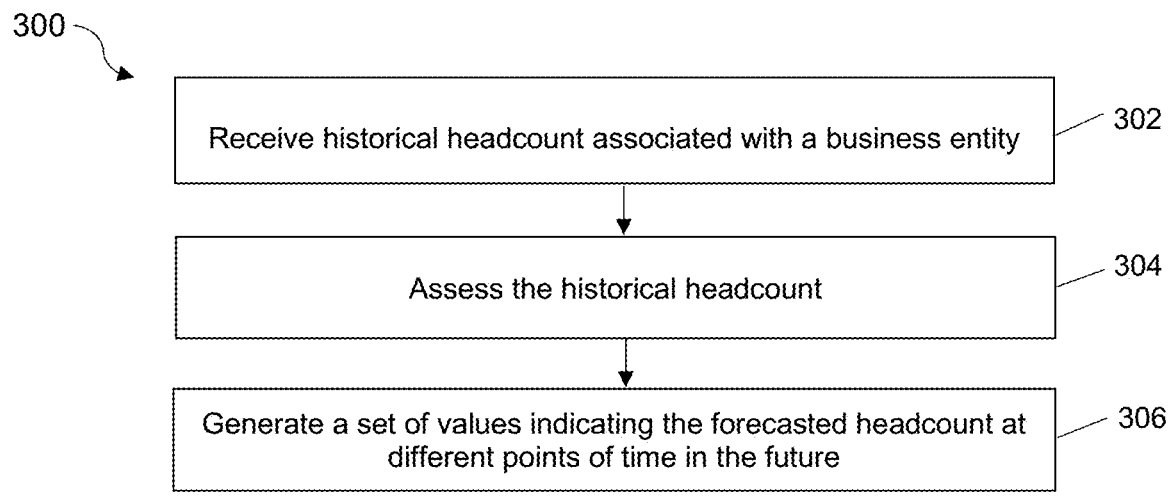
FIG. 3A is a flowchart diagram illustrating an example process configured to forecast the headcount demand associated with a business entity in accordance with some embodiments of the present disclosure.

FIG. 3A is a flowchart diagram illustrating an example process 300 configured to forecast the headcount demand associated with a business. The process 300 may be described to represent a sequence of operations that can be performed by one or more computers including hardware, software, or a combination in the above described systems. Thus, the described operations may be performed with computer-executable instructions under control of one or more processors. The order in which the operations are described is not intended to be construed as a limitation, and any number of the described operations can be combined in any order and/or in parallel to implement the process.

The application server 120 may utilize a statistical forecasting model 124 to assess the historical business headcount obtained from a user profile 128 to forecast the headcount for a business at a future time. For example, if the business is evaluating its options for a 15-year real estate lease, the business may first need to understand what the headcount is projected to be over the course of the 15 years, so that it can optimize the parameters of the 15-year lease. The forecasting model 124 may be a statistical model configured to execute an advanced statistical forecasting process for forecasting the headcount for the business in a future time span (e.g., 1-15 years in the future). The forecasting model 124 may be implemented based on statistical demand forecasting based on the information of historical headcount, peer growth and volatility associated with businesses.

At step 302, the application server 120 may receive the historical headcount associated with a business entity by reading the user profile 128 stored in a user database 127. In some embodiments, the application server 120 may obtain the historical business headcount by receiving user inputs entered by a user/client (e.g., business entity) via a user computer over a network 110.

At step 304, the application server 120 may utilize the forecasting model 124 configured to assess the past or historical headcount associated with the business entity. For example, the application server 120 may utilize the forecasting model 124 to process the historical headcount and remove any variations in the headcount that may be a result of "historical noise." Historical noise may include headcount that was affected by mergers and acquisitions, corporate reorganizations, and seasonal demands, that may have affected the historical headcount by increasing or decreasing the demands on headcount during short bursts of time. The application server 120 may then determine potential future disruptors that may affect the headcount in the future. Future disruptors include the effect automation may have on the future headcount needs. The application server may utilize the forecasting model 124 to assess the type of industry of the business (e.g., professional services, etc.), and perform an exhaustive deep dive using various research-based techniques to determine potential future disruptors. The forecasting model 124 may be configured to incorporate numerous standard rules that project how businesses may be disrupted, including how automation may affect the headcount for a business, or how software analytics may affect a business's headcount. The forecasting model 124 may be configured to consider effects of historical headcount growth, trends and volatility, impact of business disruptors, technology and economic events, and a size of footprint range and flexibility needs. The application server 120 may execute the forecasting model 124 to determine any change in utilization of the headcount.

At step 306, based on the processed historical headcount and described impacts, the application server 120 may execute the forecasting model 124 to capture or analyze how the headcount associated with the business entity evolves over time and generate a set of values indicating the forecasted headcount at different points of time in the future. For example, after the future disruptors have been applied to the system, the application server 120 may execute the forecasting model 124 to generate a corresponding headcount forecast. In some embodiments, Monte Carlo methods may be applied as fundamental computational algorithms in the headcount forecast process. Based on processed historical data and its described impacts, a set of stochastic variables may be defined as the seeds that generate random sampling to simulate various headcount increase/decrease scenarios which are generally treated as deterministic inputs in traditional models. For example, the historical growth and volatility may be translated into a normal or exponential distribution to reflect growth pattern and randomness; while the future disruptors may be defined as discrete Bernoulli distributions which represent certain probabilities of a disruptor event happening.

Figure 3B:
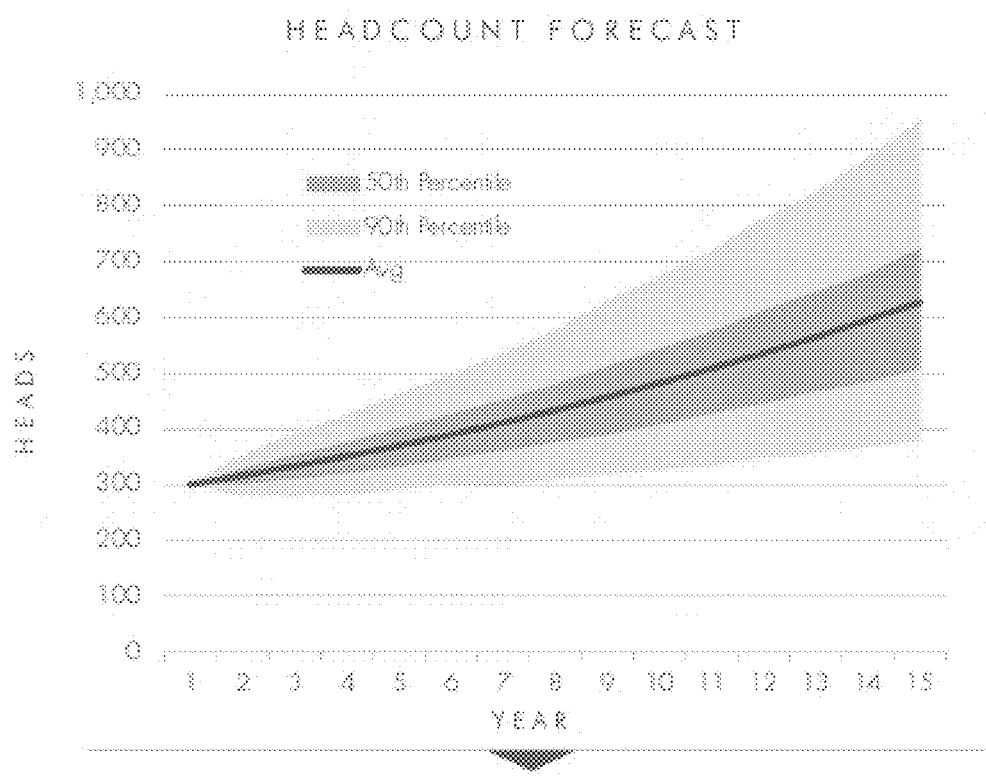
FIG. 3B is an example screen shot of visualizing forecasted headcount at different points of time in the future in accordance with some embodiments of the present disclosure.

FIG. 3B shows an example screenshot of visualizing forecasted headcount at different points of time in the future. The forecasted headcount may account for the structure of the industry, economic changes, automation and any other future disruptors that a real estate solution may provide and the client may have deemed pertinent. As illustrated in FIG. 3B, the forecasted headcount may represent a size of footprint range and flexibility needs for businesses in different future time spans.

Scenario Planning

Figure 4:
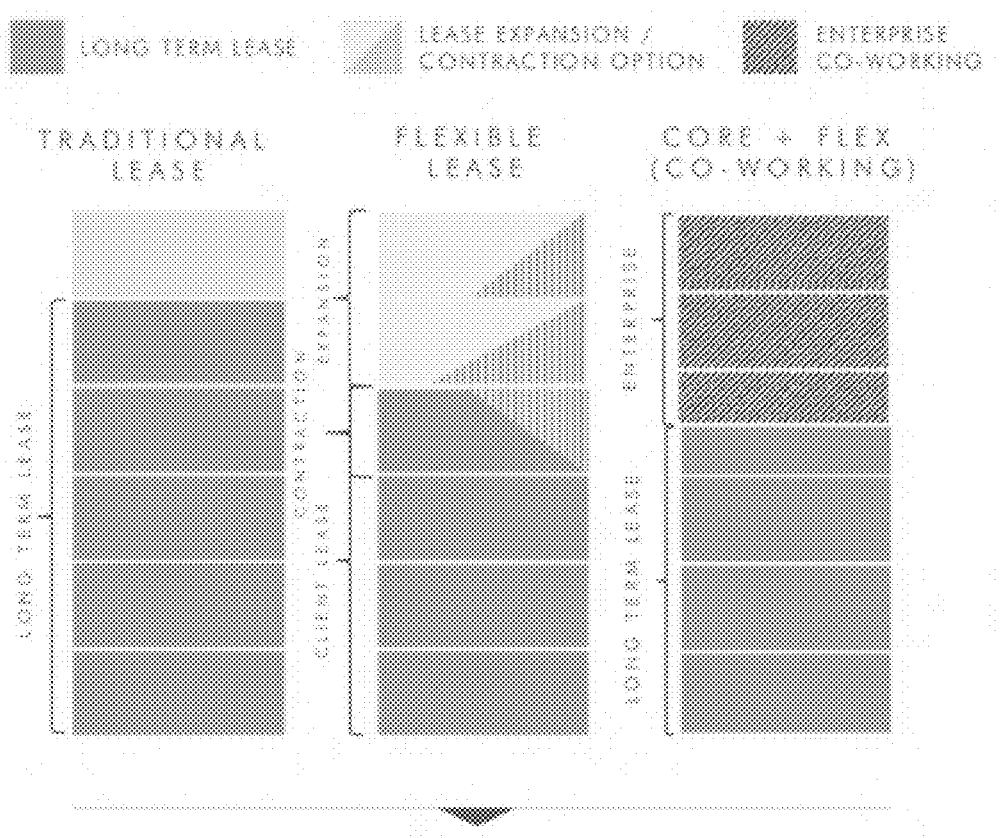
FIG. 4 shows an example screenshot of visualizing generated scenarios based on a forecasted headcount demand associated with a business entity in accordance with some embodiments of the present disclosure.

Based on the forecasted headcount determined for a business entity, the application server 120 may execute a scenario generator 125 to evaluate options in the market and available modes of flexibility to generate or develop various real estate and occupancy scenarios. FIG. 4 shows an example screenshot of visualizing generated scenarios based on the forecasted headcount demand associated with a business entity. The generated scenarios may include different options, such as a traditional lease, a flexible lease and a combination of a core and flexible co-working plan. As illustrated in FIG. 4, the flexible lease may include a client lease and an option of lease expansion. The combination of a core and flexible co-working scenario may include a long term lease and an enterprise co-working occupancy. These scenarios may be adaptable to each business and be generated based on information specific to the business and its needs. To generate these scenarios, the application server 120 may obtain the business objective dataset 204 from the business user. The business objective dataset 204 may include initial information regarding the size of the space the business is considering, the length of the real estate lease term, and the structure of the real estate lease that the business is considering.

The application server 120 may determine if there are any limitations and options that need to be considered in the scenarios. For example, if the business is considering expanding its real estate space, but there is no space available for the expansion, the application server 120 may first identify the space as a limitation and develop scenarios that do not include expansion. Similarly, if a business has a right of first refusal on real estate space that is adjacent to their space, the application server 120 may first identify that right and generate scenarios that include the right of first refusal. Additionally, if an enterprise company has a lease from a third-party flexible space provider, it may have a rolling right of termination for that flexible space. Each of these scenarios has various operating and capital costs associated with it, and the application server 120 may evaluate those costs with each scenario. The application server 120 may generate numerous real estate and occupancy scenarios based on the business objective dataset 204 associated with the business.

Stress Testing

The application server 120 may perform the stress testing on the generated scenarios against the range of headcount forecasts associated with a business entity. In some embodiments, the application server 120 may optimize real estate solutions by utilizing a neural network system 126 to perform the stress testing on the generated scenarios against the range of headcount forecasts.

A computer-implemented process to perform a stress testing on the generated scenarios may be developed with deep reinforcement learning algorithms which may be configured as computer programs (e.g., software) executed on one or more computers, in which the systems, model components, processes, and embodiments described below can be implemented.

Referring to FIG. 2, to perform the stress testing on the generated scenarios associated with a business entity, the neural network system 126 may include a policy network 220 and a value network 230 which may be configured with algorithms that use a randomly weighted policy function ("the policy network 220") and a randomly weighted value function ("the value network 230"), respectively. These algorithms of the policy network 220 and the value network 230 may utilize artificial intelligence and neural networks to perform the stress testing on the generated scenarios against the range of headcount forecasts.

The application server may be configured to train the value network 230 to accurately predict the expected future costs of real estate by minimizing the predictive error using an optimizer, such as adaptive moment estimation (ADAM). ADAM optimization is a computationally efficient stochastic optimization method, which is a first-order gradient-based optimization of stochastic objective functions. In general, stochastic optimization methods may be utilized to adjust the variables within a set of defined constraints, until it finds the best combination of variables that achieve the objective (i.e., minimal real estate costs in this case. Because of the complicated searching process and a large set of data, advanced algorithms may be used to improve efficiency and reduce computing power. ADAM optimization is one of these advanced algorithms. The ADAM optimization algorithm may be used instead of the classical stochastic gradient descent procedure to update network weights iteratively based on training data. The application server or other computing devices may train the policy network 220 to choose the best possible, cost minimizing solution for the value generated by the value network. Once the value network 230 and the policy network 220 result in the same value, the optimal real estate solution for the business may be determined for the future forecast. The policy network 220 and the value network 230 may be alternately trained until convergence to generate a future real estate solution with a minimized cost and a set of decision rules.

The value network 230 may be initialized with a randomly weighted policy function. The inputs fed into the value network 230 may be a random value, the values (size, remaining term, product type) of the real estate at the time of an option point, the values of the observable state variables (headcount, market rent) at the time of the option point and finally the allowable options that can be exercised at the time of the option point. The time of the option point may be indicative of a critical time/date which may be a decision point on whether the real solution should exercise a real estate lease option or event. For example, the time of the option point may be a notice date or effective date of a space expansion/contraction, a lease expiry date, a notice date or effective date of lease termination/renewal option, etc. The output of value network 230 may be the predicted next action that the user/client may take to minimize the expected future costs of real estate. For example, for a lease with an expansion option in year five for a single floor, the input to value network 230 may be the size of the lease, the remaining term, the headcount in year five and the size of the expansion option. The output of value network 230 may be a one or a zero, representing taking the option or not taking the option, respectively. To transform the values of the inputs to the outputs, the vector of inputs may be first normalized, then multiplied by a vector of weights, and this may be performed repeatedly (using a standard feedforward neural network), and the resulting vector may be constrained to lie in the allowable values.

The value network 230 may be initialized with a randomly weighted value function. The value function is a similar neural network to the policy function. The value function may receive the same inputs as the policy function, as well as take the predicted action of the policy function. The value function may output an estimate of the future expected real estate costs if the user/client takes the expected action.

Both policy networks 220 and value networks 230 are sets of analytical methodologies to study the interdependence and linkage between nodes (people or events) or between a business entity and scenarios associated with the business entity. The interdependence and linkage are quantified to reflect how strong two nodes (people or events) are correlated. By testing randomly weighted policy networks 220 or value networks 230 and refining the network weights utilizing artificial intelligence algorithms given defined optimization goals, the existing networks may be "trained" to best represent how nodes (people and events) are connected and impacting each other. A computing device or the application server 120 may train the neural network system 126 according to a sampling process described below. The process shown below is an example and is not intended to be construed as a limitation. Other similar processes known in the art may be used to train the neural network.

1) Create a headcount scenario using a headcount predicting model.
2) Walk through the created scenario, and at each decision point, choose the action that minimizes the cost of future real estate as predicted by the policy function.
3) After each scenario, add the decision points, the function inputs and the outcomes to an array.
4) Initially repeat steps 1, 2, and 3 for some number of times (e.g., 1000 times) for an initialization period.
5) Sample a batch of decision points, inputs and actions.
6) Train the value network 230 to accurately predict the expected future costs of real estate by minimizing the predictive error using an ADAM optimizer.
7) Repeat steps 1, 2, 3, 5 and 6 for a number of times, until convergence (i.e., the weights of the network stop changing)
8) Train the policy network 220 to choose the best possible cost minimizing policy by substituting the predicted value from the value network 230 for the actual value of the estimated future real estate costs.
9) Repeat steps 1 to 6 until convergence (i.e., the policy network 220 and value network 230 stop changing).

For example, the application server may begin by generating headcount scenarios. These headcount scenarios may be future headcount amounts at the desired frequency of sampling, for the decision period. For example, a headcount scenario may be the annual headcount for two business units in the same location, for the next ten years. Or it may be the monthly headcount at two locations, for the next five years. These solutions are forwarded to an "agent" which is responsible for coordinating the entire training process. That agent may then forward the initial state, (whatever the first headcount state is) to the action network. The action network may predict the next best action to take, of the available actions. For example, at the beginning of a lease, there are not many actions to consider, but the user/client could sublease space, sign a lease for additional space, or sign a lease for short term flexible space. The action network returns a predicted best combination of actions at the point of evaluation, which can also be no action at all. At the beginning, the action network's answers may be primarily random, to ensure that the agent efficiently explores the possible actions to take. The agent then receives the action and sends the current state and the action to the evaluation environment. There is also an evaluation environment that looks at the costs of different real estate options. It takes in the current state and the action and returns a cost. For example, beginning a new lease requires capital for build out and the user/client may begin to pay rent. The evaluation environment requires data on local real estate costs and the availability of space. It then returns the cost for the period. The evaluation environment also returns the new state, which can be random. For example, if the user/client chose to do nothing at the first month of a new lease, the evaluation environment may return the same lease, but now at month two. The agent may save these variables, the cost, action, state and next state to a memory. This process may be repeated at first some number of times for initialization, until the memory has reached some number of experiences.

At this point, the agent may transit to a new phase of the process where the networks may be trained. This begins with taking a sample of the experiences from the memory. These sampled experiences are sent to the target action network, which is a frozen (not as frequently updated) version of the action network. The target action network may evaluate the next state and return a next action. The next state and next action may be forwarded to a target value network, which is a frozen copy of the value network and an estimated value may be returned for being in the next state, and taking the next action, in the next period. The sum of the reward that the agent experienced, plus the discounted estimated value of the next period, becomes the value of being in this state. The state of this period and the action taken this period are sent to the value network, to obtain the estimated value of being in this period and taking the action. The estimated loss is some function of the expected value and the actual value. The optimization engine then updates the weights of the value network to minimize the loss function. The updated value function is then used to evaluate the value of taking the actions prescribed by the action network, and the action network's parameters are updated in the direction of the gradient of the value network by an optimizer. Then the target networks are updated in the directions of the current value and action networks. This process is repeated until convergence.

Figure 5:
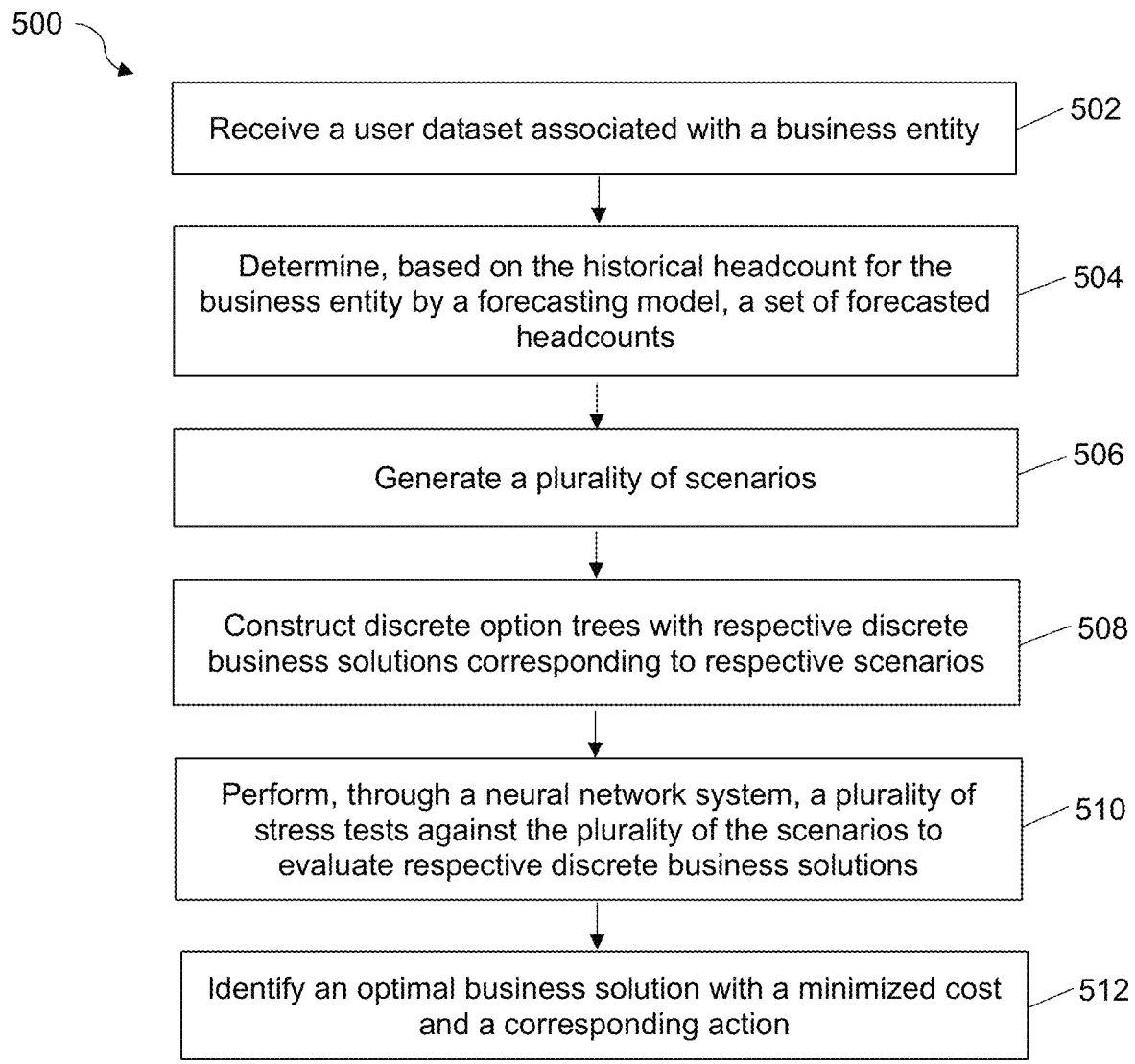
FIG. 5 is a flowchart diagram illustrating an example process configured to optimize a real estate solution in a practical application in accordance with some embodiments of the present disclosure.

FIG. 5 is a flowchart diagram illustrating an example process configured to optimize real estate solutions in a practical application. The process 500 may be described to represent a sequence of operations that can be performed by one or more computers including hardware, software, or a combination in the above described systems. Thus, the described operations may be performed with computer-executable instructions under control of one or more processors. The order in which the operations are described is not intended to be construed as a limitation, and any number of the described operations can be combined in any order and/or in parallel to implement the process.

At step 502, the application server 120 may receive a user dataset 210 associated with a business entity via a network 110. In one embodiment, the user dataset 210 may be read from a user profile 128 stored in the database 127. The user dataset 210 associated with the business entity may include a historical business dataset 202 with a historical headcount for the business entity and a business objective dataset 204. The application server 120 may receive the historical business headcount from user inputs entered by a user/client via a user computing over a network 110.

At step 504, based on the historical headcount of the business entity, the application server 120 may execute a forecasting model to determine a set of forecasted headcounts at different points of future time. As described above, prior to the optimization process, a forecasting model 124 (e.g., statistical model) may be created and configured to capture how headcount of the business evolves over a time period. The headcount of the business may account for the structure of the industry, economic changes, automation and/or any other future disruptors that the real estate solution provider and the client have deemed pertinent.

At step 506, based on the set of forecasted headcounts and the business objective dataset 204, the application server 120 may execute a scenario generator 125 to generate a plurality of scenarios associated with the business entity. As described in FIG. 4, the generated scenarios may include different options of real estate solutions provided to the business entity.

At step 508, the application server 120 may construct discrete option trees with respective discrete real estate solutions corresponding to respective scenarios. In some embodiments, an option tree may be constructed to represent the real estate and leasing decisions that are available to the business entity over the life of the analysis, and the interdependencies between those options. For example, a right of first refusal on adjacent space is an expansion option with a specific date, while an enterprise lease from a third-party flexible space provider has a rolling right of termination. Each of these options has embedded within them several other decisions, which may either be discrete or continuous. An expansion may be on a variable number of floors and the term length of the commitment may also be a decision. This option tree may begin with the initial decisions of commitment, like lease size, lease term and lease structure, and go all the way out either to a defined end date or continue in perpetuity.

Each of these options may come with associated costs, both capital and operating, that come from market knowledge, previous transactions, and occasionally a separate stochastic model of the evolution of the rent market.

At step 510, the application server 120 may execute a trained neural network system to perform a plurality of stress tests on the plurality of the scenarios against the forecasted headcount and the option trees to evaluate respective discrete real estate solutions and determine respective costs and actions associated with respective discrete real estate solutions.

During the stress testing of the generated scenarios associated with the business, the application server 120 may generate various situations and associated costs for each of those situations. The trained neural network system may perform the stress test many times against various real estate and occupancy scenarios, such as 1000 times. The system may sample a batch of decision points, inputs and actions.

For a given situation, the application server 120 may evaluate what the associated action is and what the cost for that action is for the business. This information may be inputted into a database in the computing system including at least the application server 120. As more of this information gets inputted into the system, the system becomes more intelligent in generating an accurate estimate for the business. For example, the system may analyze a business for the current time and what real estate space was needed for the present headcount. Over time, the system may capture more and more of this information, and becomes more intelligent as to given situations, such as what the action taken at the time was, and what the related cost was for that action at that time. Once the system is equipped with this information, the system may perform a policy function to determine what the minimal cost for the situation might be. The policy function may evaluate the size, the remaining term, the product type, the headcount, the market rent, and the options that can be exercised at the time of the future analysis. From this analysis, the application server 120 may determine the action the business may take to minimize the expected future costs of real estate. For example, for a lease with an expansion option in year five for a single floor, the input would be the size of the lease, the remaining term, the headcount in year five and the size of the expansion option, and the output may be a one or a zero, representing taking the option or not taking the option. A feedforward neural network may be utilized for this process.

Figure 6:
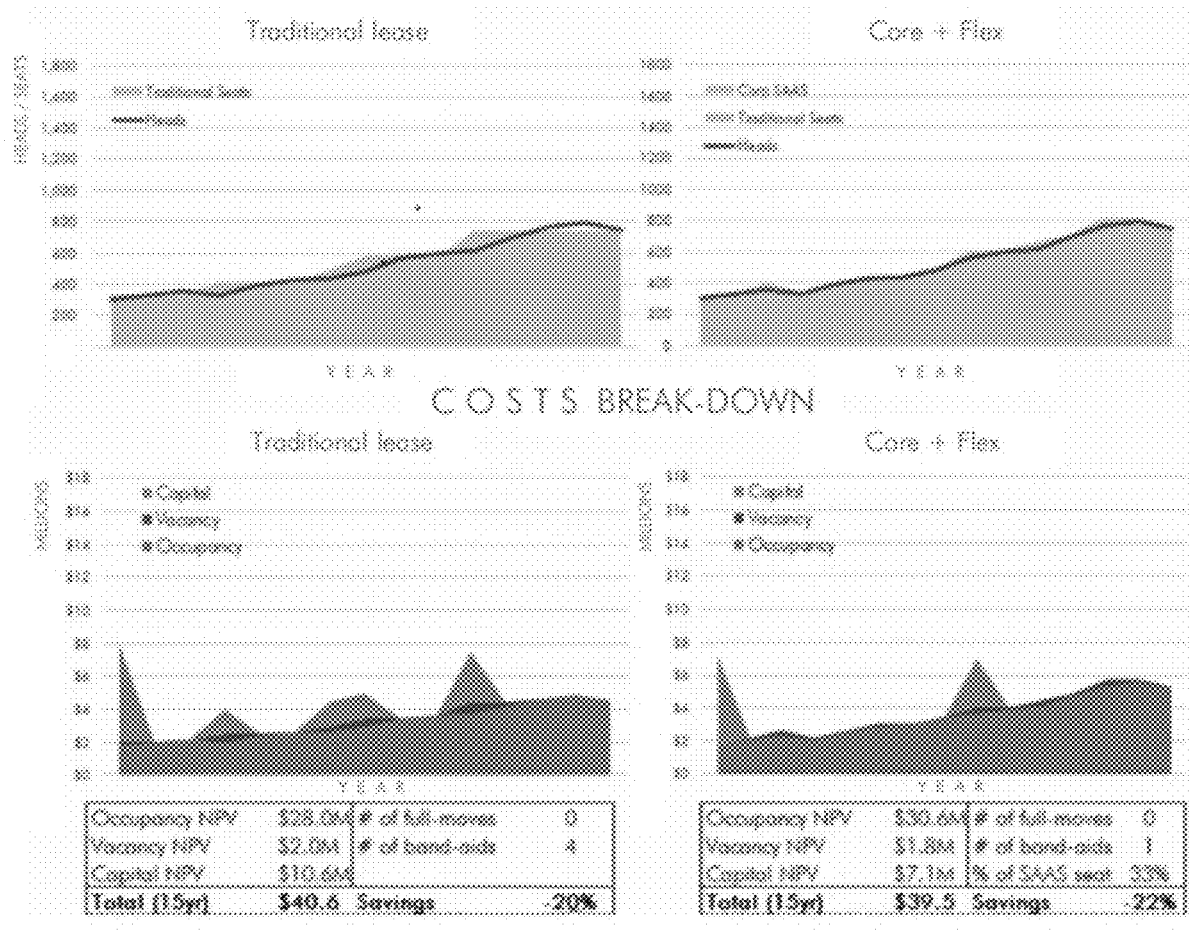
FIG. 6 shows an example screenshot of results of performing stress tests on the generated scenarios in accordance with some embodiments of the present disclosure.

FIG. 6 shows a screenshot of example results of performing stress tests on scenarios against the range of headcount forecasts. The example results may indicate growth/contraction impact on space needs over time and may be used for analyzing financial impact and assessing risk profile under high growth/contraction.

At step 512, the application server 120 may determine and identify, based on the determined respective discrete real estate solutions, an optimal real estate solution 240 with a minimized cost and a corresponding action that the business entity takes to minimize the costs.

In some embodiments, the application server 120 may utilize the trained policy network 220 and the trained value network 230 to evaluate several discrete option trees which represent discrete real estate solutions for different sizes of the initial lease, different expansion or contraction options of the use of flexible space. During evaluation, the application server 120 may perform mean running on many scenarios to sample the average costs, the lowest costs, the highest costs, and the entire distribution of net present values for future real estate solutions. Thus, a version of each real estate solution may be obtained and the solution may include minimal costs and a set of future decision rules that the user/client can use to accomplish the same.

Figure 7:
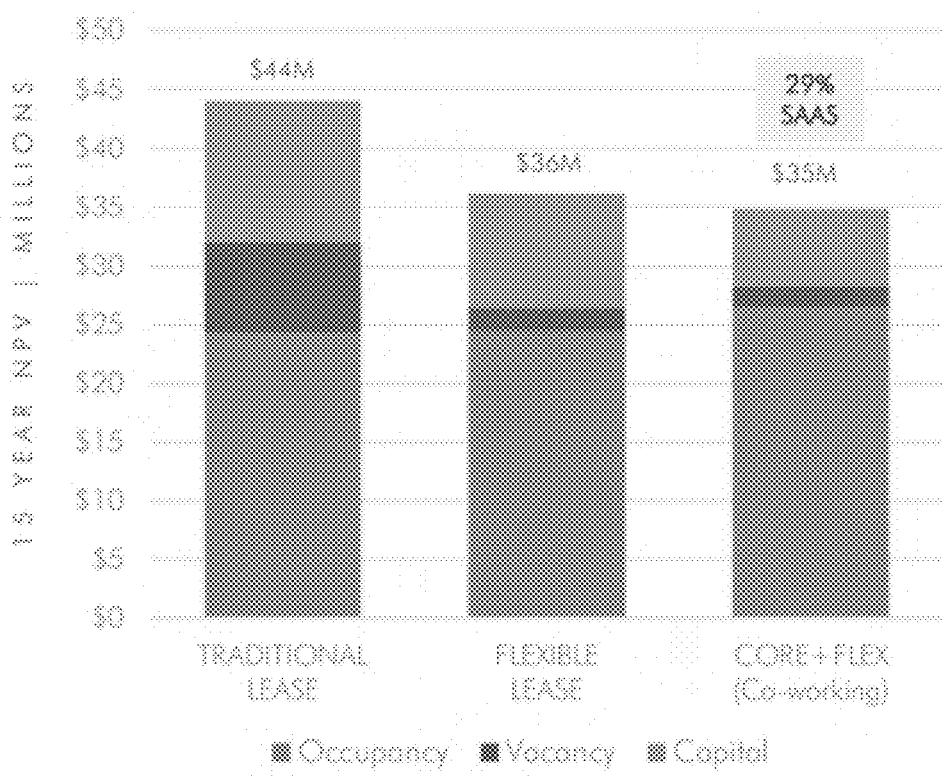
FIG. 7 shows an example screenshot of results of comparison of real estate solution scenarios in accordance with some embodiments of the present disclosure.

In some embodiments, the optimization process may compare financial performance and risk of real estate strategies so as to obtain optimal solutions for footprint, size and mix of flexibility & co-working. FIG. 7 shows an example screenshot of results of comparison of agile alternatives of a traditional lease, a flexible lease and a core and flexible (co-working) option in accordance with some embodiments. As shown, a traditional lease may be generally a baseline scenario where a traditional long-term lease is signed and occupied, directed by business's estimate of space needed. A flexible lease may be a traditional lease, but it's optimized and designed to include the right amount of initial space and lease options at specific time and size, given headcount forecast and stress-testing. A Core and Flex (co-working) may be a hybrid real estate structure that has both a traditional lease and a license agreement with a co-working provider, where the structure is optimized and designed given headcount forecast and stress-testing. In addition, as illustrated in FIG. 7, Net Present Value (NPV) Costs are usually broken down to Occupancy Costs (total real estate costs for the portion that is utilized by business), Vacancy Costs (total real estate costs for the portion that is vacant or significantly underutilized by business) and Capital Costs (total capital costs required to build out space, buy furniture, etc.). This specific way of reporting financial costs may give the client an idea of the value of real estate flexibility (which may minimize capital spend and vacancy costs) and the limitations of traditional lease options. For traditional lease options, capital spend is still very high compared with co-working/flexible space. Lastly, the model may determine the percentage of total space/portfolio that may be structured as co-working/flexible space, i.e., Space As A Service (SAAS). For example, the optimized solution may be illustrated as having a co-working/flexible space of 29% SAAS.

In some embodiments, the application server 120 may generate and include various real estate and occupancy models. The application server 120 may perform the stress testing on the various solutions.

In some embodiments, a supply and demand model may be constructed which ties future states of the client headcount and the real estate model to a total cost of occupancy, which includes both the cost of the occupancy solution at that time, as well as lost productivity due to lack of space. The supply and demand model may be a process of translating headcount forecast (e.g., heads) to seat demand (e.g., number of seats and special amenities needed, based on a set of workplace strategies like seat sharing program, hot desking/hoteling, work from home policy, meeting room seats to heads ratio, etc.) and eventually to total square footage needed (based on workplace design standards like square foot per private office, workstation, conference room, etc.). A real estate model may be indicative of a real estate deal structure with economics factors. The real estate deal structure may include size of main premise footprint, time and size of expansion/contraction options if any, and anything in a space lease or license agreement that may impact the space supply. The economics factors may underlie a financial model and associated with (rent, operating costs, taxes, capital requirement, landlord allowance, etc.

Visual Reporting to Businesses

Referring back to FIG. 1, in addition to the innovative process for forecasting the real estate space needs for businesses, the application server 120 may provide an innovative feature of a visual report to businesses via an interface 129. For example, the application server 120 may include a visual interface that identifies the various options for the business, including what the business's unoccupied lease space may look like for various plans.

Figure 8:
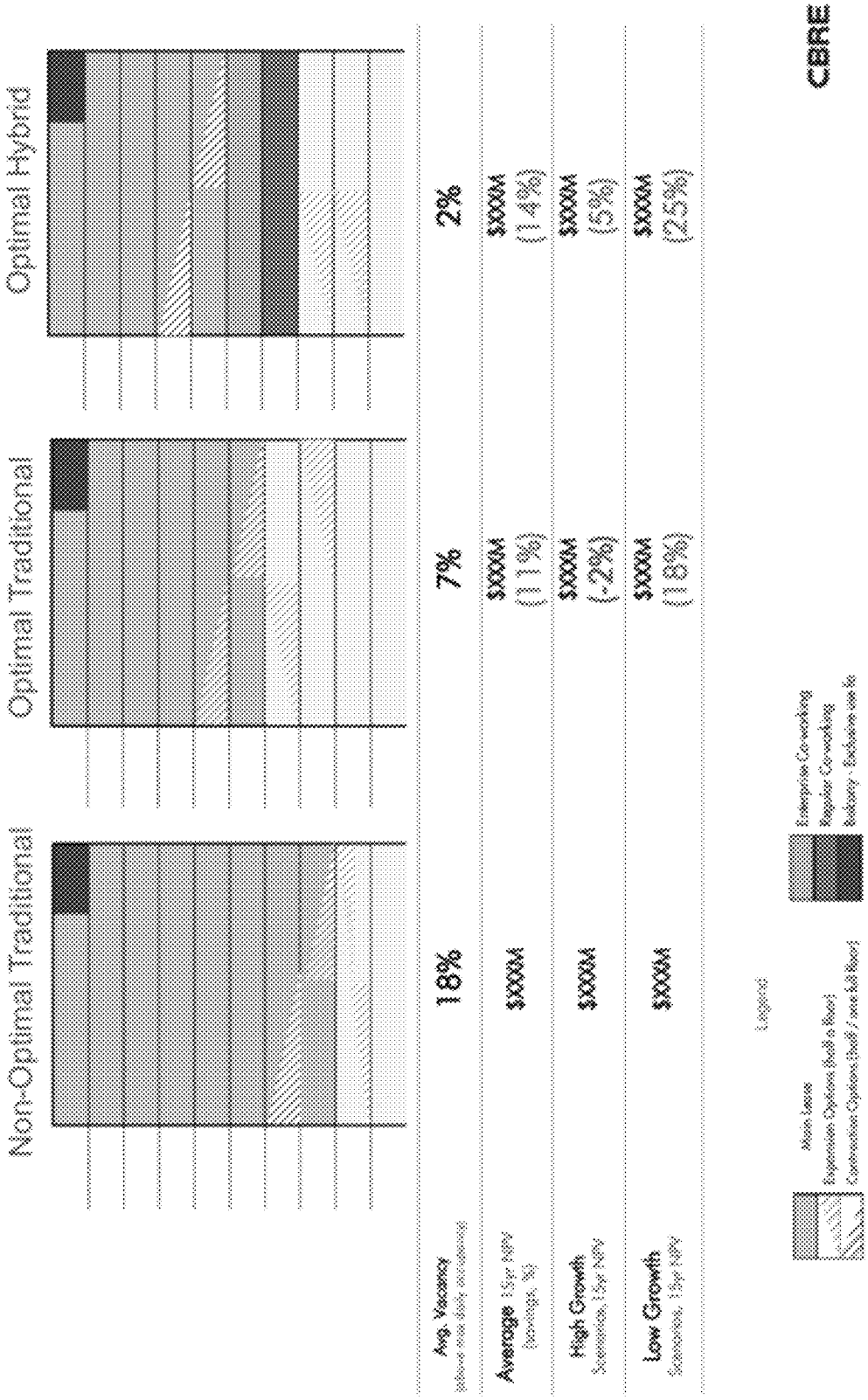
FIG. 8 shows an example screenshot of results of a traditional lease versus a hybrid co-working solution in accordance with some embodiments of the present disclosure.

FIG. 8 illustrates example results of traditional lease versus a hybrid co-working solution in accordance with some embodiments. As illustrated in FIG. 8, a hybrid solution may be identified as an optimized real estate solution. The visual interface 129 may show the business that a traditional long-term lease may result, on average, in 18% of its leased space being left unoccupied. That is a cost the business may spend without being able to utilize the leased space. Alternatively, it may also show the business that the optimal solution, which may incorporate both traditional lease space as well as flexible work space, may only result, on average, in 2% of its leased space being left unoccupied. The illustrated visual report also shows the financial comparison of each occupancy plan given a few representative headcount scenarios, which gives the business a complete view of what may happen in various future growth scenarios. The visual representation may help businesses quickly identify the optimal solution for their needs.

Generating a Value for how to Use Flexible Space

In some embodiments, the described computing system may provide a value for how to use flexible real estate space. As a result of the extensive stress testing that the system performs, the system may identify scenarios that include flexible office space. As a result, the system may provide solutions to businesses that combine both traditional leases with flexible office space solutions. The system's ability to combine the option of flexible office space along with a traditional long-term lease drastically increases the range of possibilities available to businesses for their real estate and ensures that businesses find the optimal solution that's the most affordable for their needs.

Figure 9:
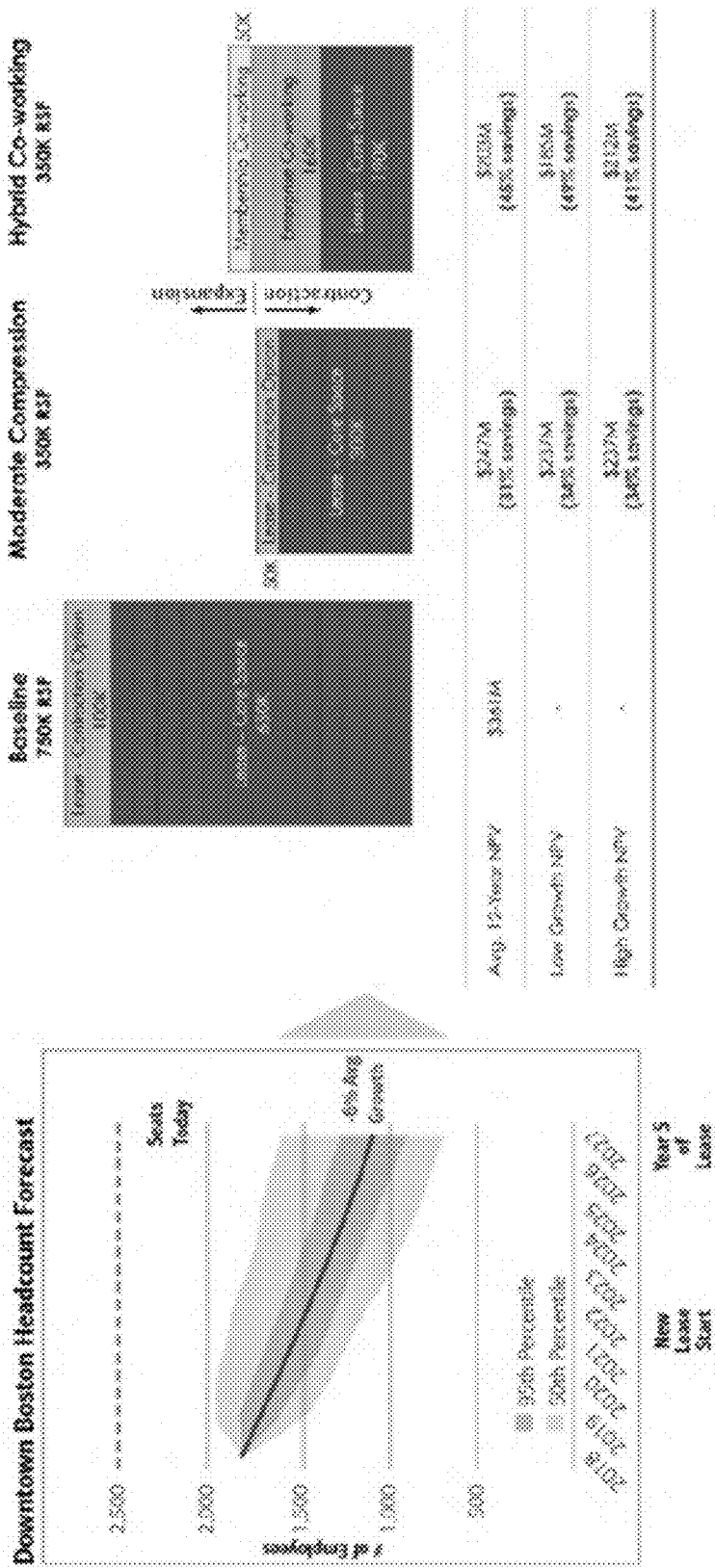
FIG. 9 shows an example screenshot of results of example real estate solutions in accordance with some embodiments of the present disclosure.

FIG. 9 illustrates an example screenshot of results of a traditional lease versus a hybrid co-working solution in accordance with some embodiments. As illustrated in FIG. 9, a hybrid co-working solution may be identified as an optimized real estate solution as compared with a traditional lease solution. For example, the standard report may include a headcount forecast chart showing the average value and the range of the headcount values ($50^{th}$ and $95^{th}$ percentile) as a summary of the simulations. Then, the report may display a space/building stack diagram describing the detailed space structure including size, space type (owned space, traditional lease, various co-working space types like enterprise co-working, shared co-working, private suites, etc.), and options available in each scenario. Lastly, an NPV financial result may be represented comparing how each scenario performs on average, low growth ($5^{th}$ percentile) and high growth ($95^{th}$ percentile) situations in order to give client a full picture of potential risk.

Figure 10:
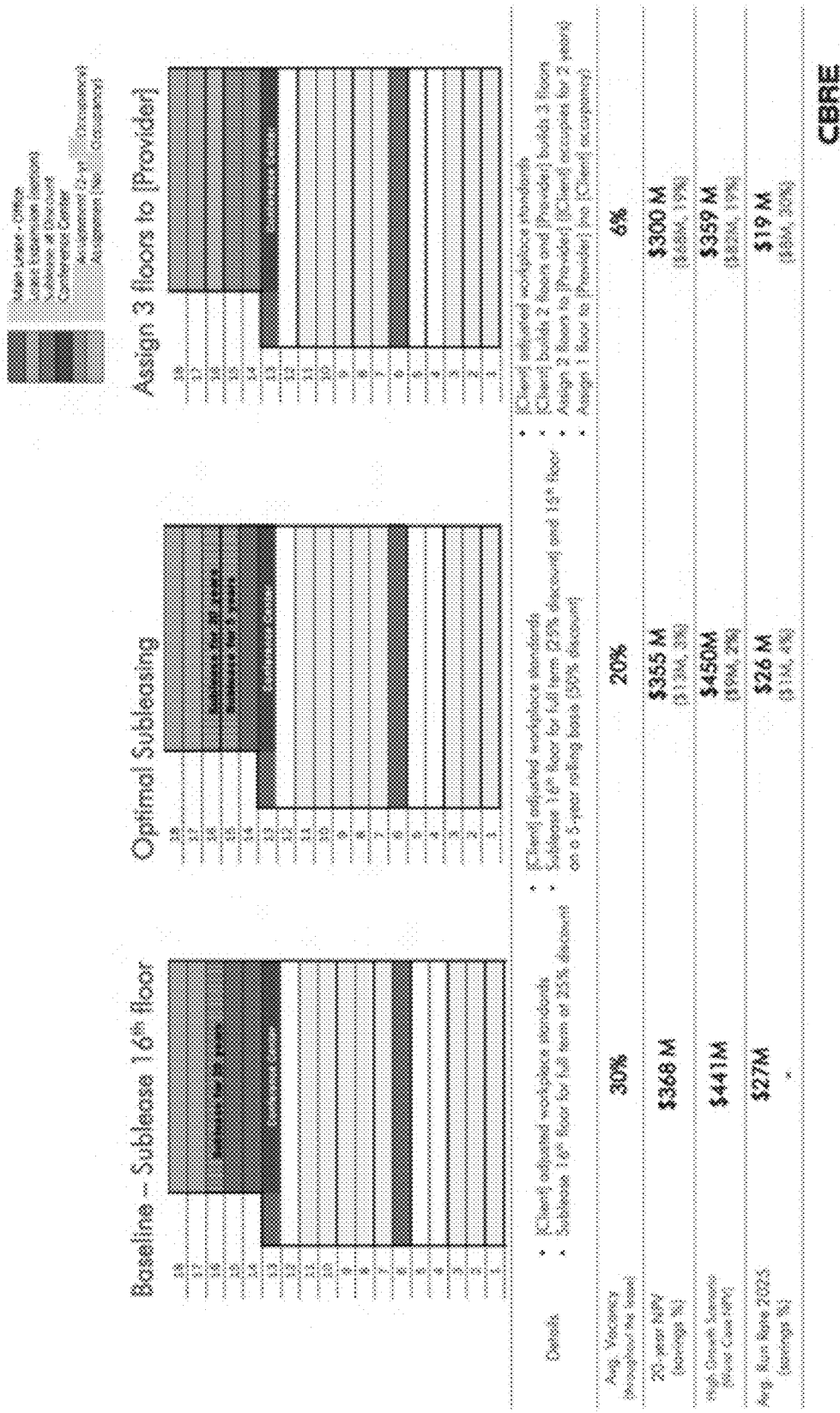
FIG. 10 shows an example screenshot of real estate solutions of a traditional sublease versus a co-working assignment in accordance with some embodiments of the present disclosure.

FIG. 10 illustrates an example screenshot of real estate solutions of a traditional sublease versus a co-working assignment in accordance with some embodiments. As illustrated in FIG. 10, a co-working assignment solution may be identified as an optimized real estate solution as compared with a traditional sublease solution and an optimal subleasing solution. The visual interface 129 may show the business that a traditional sublease may result, on average, in 30% of its leased space being left unoccupied. That is a cost the business may spend without being able to utilize the subleased space. Alternatively, it may also show the business that the optimal solution, which may incorporate both traditional lease space as well as flexible co-working space may only result, on average, in 6% of its leased space being left unoccupied.

To assist businesses in determining optimal solutions for their long-term real estate needs, a computing system may be provided to help forecast the size of real estate space and mix of leasing options that may minimize a business's real estate spending over time. The system may provide a statistical understanding of a business's space needs, and help businesses plan for their long-term needs. Adequate planning based on statistical analysis and statistical trends may save businesses significant money, reduce risk, and minimize ongoing business disruption. The statistical analysis implemented by the computing system may be used to help businesses forecast optimal projections for space utilization and other business objectives in the long term.

In some embodiments, the described futureproofing strategies implemented by computing system may provide an aggregated picture of the real estate needs of a business, and the range of possibilities for the business. The system may provide the optimal combination of traditional lease options, lease expansion or contraction options, and co-working options.

In addition to being used by businesses to forecast future real estate needs and minimize costs, the described futureproofing strategies implemented by the computing system may be used in other situations where there is a need for long-term real estate planning. For example, the system may be used to plan the overall need for hotel rooms in a city or region, or the system may be used by a flexible space provider to plan its inventory of long-term leases.

Figure 11:
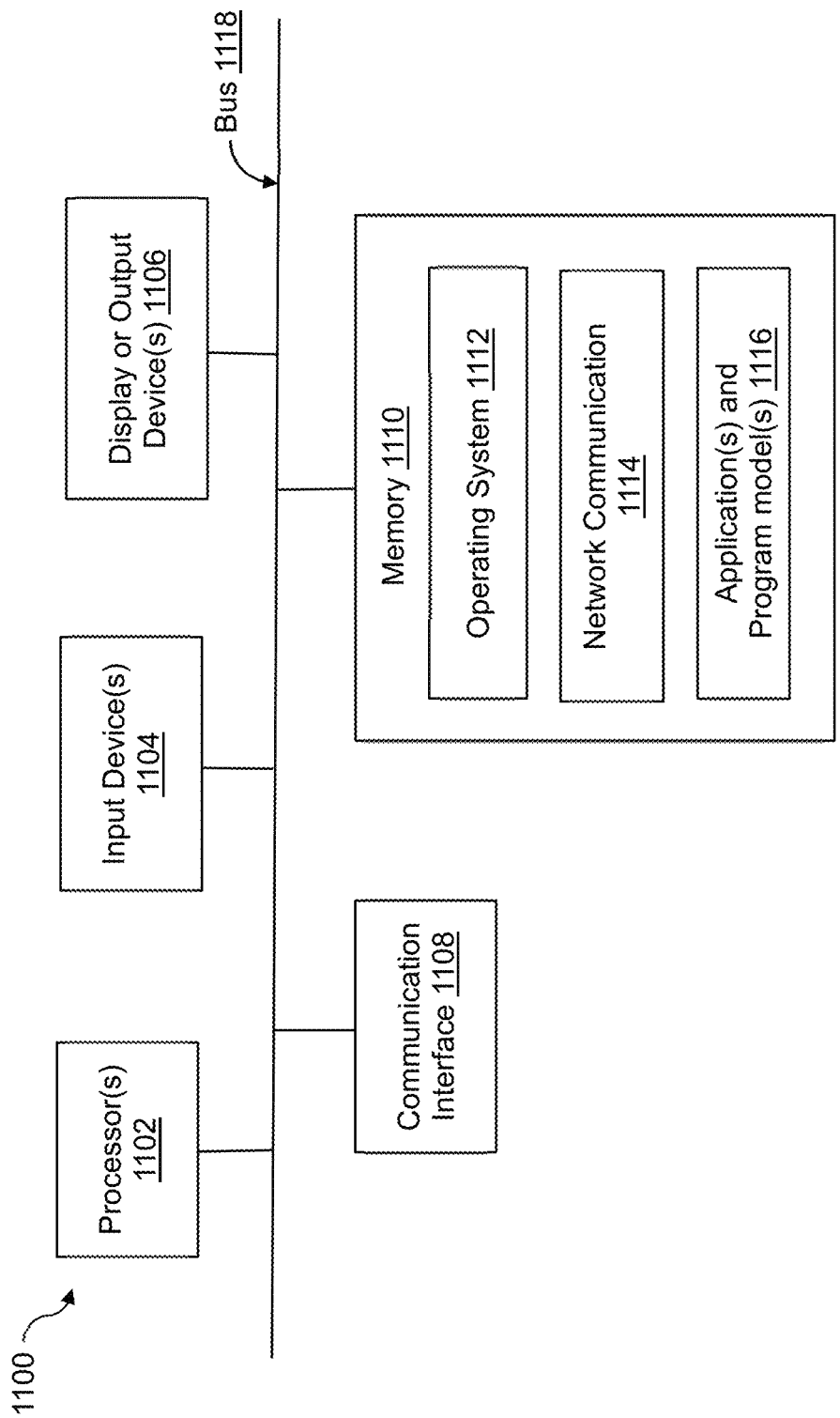
FIG. 11 is a block diagram of an example computing device in accordance with some embodiments of the present disclosure.

FIG. 11 is a block diagram of an example computing device 1100 that may be utilized to execute embodiments to implement processes including various features and functional operations as described herein. For example, computing device 1100 may function as application server 120, user/client devices 130 or a portion or combination thereof in some embodiments. The computing device 1100 may be implemented on any electronic device to execute software applications derived from program instructions, and may include but is not limited to personal computers, servers, smart phones, media players, electronic tablets, game consoles, email devices, etc. In some implementations, the computing device 1100 may include one or more processors 1102, one or more input devices 1104, one or more display or output devices 1106, one or more communication interfaces 1108, and memory 1110. Each of these components may be coupled by bus 1118, or in the case of distributed computer systems, one or more of these components may be located remotely and accessed via a network.

Processor(s) 1102 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 1104 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1306 such as a CRT (cathode ray tube) or LCD (liquid crystal display) monitor for displaying information to the user and a keyboard and a pointing device such as a mouse or a trackball by which the user can provide input to the computer. Display device 1106 may be any known display technology, including but not limited to display devices using Liquid Crystal Display (LCD) or Light Emitting Diode (LED) technology.

Communication interfaces 1108 may be configured to enable computing device 1100 to communicate with other another computing or network device across a network, such as via a wired connection, a wireless connection, or a combination of wired and wireless connections. For example, communication interfaces 1108 may include an Ethernet interface, an optical interface, a coaxial interface, an infrared interface, a radio frequency (RF) interface, a universal serial bus (USB) interface, a Wi-Fi interface, a cellular network interface, or the like.

Memory 1110 may be any computer-readable medium that participates in providing computer program instructions and data to processor(s) 1102 for execution, including without limitation, non-volatile storage media (e.g., optical disks, magnetic disks, flash drives, etc.), or volatile storage media (e.g., SDRAM, ROM, etc.). Memory 1110 may include various non-transitory computer-readable instructions for implementing an operating system 1112 (e.g., Mac OS®, Windows®, Linux), network communication 1114, and Application(s) and program modules 1116, etc. The operating system may be multi-user, multiprocessing, multitasking, multithreading, real-time, and the like. The operating system may perform basic tasks, including but not limited to: recognizing input from input device 1104; sending output to display device 1106; keeping track of files and directories on memory 1110; controlling peripheral devices (e.g., disk drives, printers, etc.) which can be controlled directly or through an I/O controller; and managing traffic on bus 1118. Bus 1118 may be any known internal or external bus technology, including but not limited to ISA, EISA, PCI, PCI Express, NuBus, USB, Serial ATA or FireWire.

Network communication 1114 instructions may establish and maintain network connections (e.g., software applications for implementing communication protocols, such as TCP/IP, HTTP, Ethernet, telephony, etc.).

Application(s) and program modules 1116 may include software application(s) and different functional program modules which are executed by processor(s) 1102 to implement the processes described herein and/or other processes. The program modules may include but not limited to software programs, objects, components, data structures that are configured to perform particular tasks or implement particular data types. The processes described herein may also be implemented in operating system 1112.

Communication between various network and computing devices may be facilitated by one or more application programming interfaces (APIs). APIs may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

Although the term "at least one" may often be used in the specification, claims and drawings, the terms "a", "an", "the", "said", etc. also signify "at least one" or "the at least one" in the specification, claims and drawings.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method for optimizing future real estate solutions, comprising:

receiving, by a server computing device comprising a processor and a non-volatile memory storing computer-executable instructions, a user dataset associated with a business entity from a user computing device via a network, wherein the user dataset comprises a historical headcount associated with the business entity and a business objective dataset;

determining, based on the historical headcount associated with the business entity, a set of forecasted headcounts at different points of a future time span;

generating, based on the set of forecasted headcounts and the business objective dataset, a plurality of scenarios associated with the business entity;

constructing discrete option trees with respective discrete real estate solutions corresponding to respective scenarios;

performing, through a neural network system, a plurality of stress tests on the plurality of the scenarios against the respective forecasted headcounts and the discrete option trees to evaluate the respective discrete real estate solutions and determine respective costs and actions associated with the respective discrete real estate solutions, wherein the neural network system comprises a value network and a policy network that are alternatively trained until convergence, the value network being trained via a randomly weighted value function to predict the respective costs and actions associated with the respective discrete real estate solutions, and the policy network being trained via a randomly weighted policy function to predict an optimal real estate solution with a minimized cost based on an output of the value network, wherein the performing comprises:

generating, using the value network, a plurality of next actions for the business entity to take to minimize expected future costs based on the respective forecasted headcounts and the discrete option trees, and selecting, using the policy network, the optimal real estate solution for the business entity to take based on the plurality of next actions generated by the value network; and providing information for causing a visual representation identifying the optimal real estate solution for the business entity to be presented on a display of the user computing device.

2. The method of claim 1, comprising:
generating a value for using a flexible office space solution; and
providing the business entity with an option that combines a traditional lease option with the flexible office space solution.

3. The method of claim 1, wherein the neural network system is a feedforward neural network.

4. The method of claim 1, comprising:
iteratively training the value network to predict future costs of the real estate solutions by minimizing a predictive error using an optimizer; and
training the policy network to choose a best cost minimizing solution for the costs predicted by the value network.

5. The method of claim 4, wherein the optimizer is an adaptive moment estimation (ADAM) optimization algorithm configured to update network weights iteratively based on training data.

6. The method of claim 4, wherein the policy network and the value network are trained with a set of values associated with the business entity at the time of an option point.

7. The method of claim 6, wherein the set of the values comprises a size, a remaining term, a product type of the business entity, and the time of the option point comprises a notice date, an effective date of a space contraction, a lease expiry date, and an effective date of lease termination associated with the business entity.

8. The method of claim 1, wherein each forecasted headcount is represented by a range of headcount values, and each of the plurality of the scenarios comprises a space type and respective capital costs associated with the business entity.

9. The method of claim 1, wherein the business objective dataset associated with the business comprises a lease space, a lease term, and a lease structure that the business entity requests.

10. A computing system, comprising:
a non-volatile memory storing computer-executable instructions; and
a processor coupled to the memory that, when executing the instructions is configured to:
receive a user dataset associated with a business entity from a user computing device via a network, wherein the user dataset comprises a historical headcount associated with the business entity and a business objective dataset;

determine, based on the historical headcount associated with the business entity, a set of forecasted headcounts at different points of a future time span;

generate, based on the set of forecasted headcounts and the business objective dataset, a plurality of scenarios associated with the business entity;

construct discrete option trees with respective discrete real estate solutions corresponding to respective scenarios;

perform, through a neural network system, a plurality of stress tests on the plurality of the scenarios against the respective forecasted headcounts to evaluate the respective discrete real estate solutions and determine respective costs and actions associated with the respective discrete real estate solutions, wherein the neural network system comprises a value network and a policy network that are alternatively trained until convergence, the value network being trained via a randomly weighted value function to predict the respective costs and actions associated with the respective discrete real estate solutions, and the policy network being trained via a randomly weighted policy function to predict an optimal real estate solution with a minimized cost based on an output of the value network, wherein the performing comprises:

generating, using the value network, a plurality of next actions for the business entity to take to minimize expected future costs based on the respective forecasted headcounts and the discrete option trees, and selecting, using the policy network, the optimal real estate solution for the business entity to take based on the plurality of next actions generated by the value network; and provide information causing a visual representation identifying the optimal real estate solution to be presented on a display of the user computing device.

11. The computing system of claim 10, wherein the processor is further configured to:
generate a value for using a flexible office space solution; and
provide the business entity with an option that combines a traditional lease option with the flexible office space solution.

12. The computing system of claim 10, wherein the neural network system is a feedforward neural network.

13. The computing system of claim 10, wherein the processor is further configured to:
iteratively train the value network to predict future costs of the real estate solutions by minimizing a predictive error using an optimizer; and
train the policy network to choose a best cost minimizing solution for the costs generated by the value network.

14. The computing system of claim 13, wherein the optimizer is an adaptive moment estimation (ADAM) optimization algorithm configured to update network weights iteratively.

15. The computing system of claim 13, wherein the policy network and the value network are trained with a set of values associated with the business entity at the time of an option point.

16. The computing system of claim 15, wherein the set of the values comprises a size, a remaining term, a product type of the business entity, and the time of the option point comprises a notice date, an effective date of a space contraction, a lease expiry date, and an effective date of lease termination associated with the business entity.

17. The computing system of claim 10, wherein each forecasted headcount is represented by a range of headcount values, and each of the plurality of the scenarios comprises a space type and respective capital costs associated with the business entity.

18. The computing system of claim 10, wherein the business objective dataset associated with the business comprises a lease space, a lease term, and a lease structure that the business entity requests.

\* \* \* \* \*